Dec. 17, 1929.  F. SCHUH  1,739,866
WIND AND WATER WHEEL
Filed April 2, 1926  2 Sheets-Sheet 1
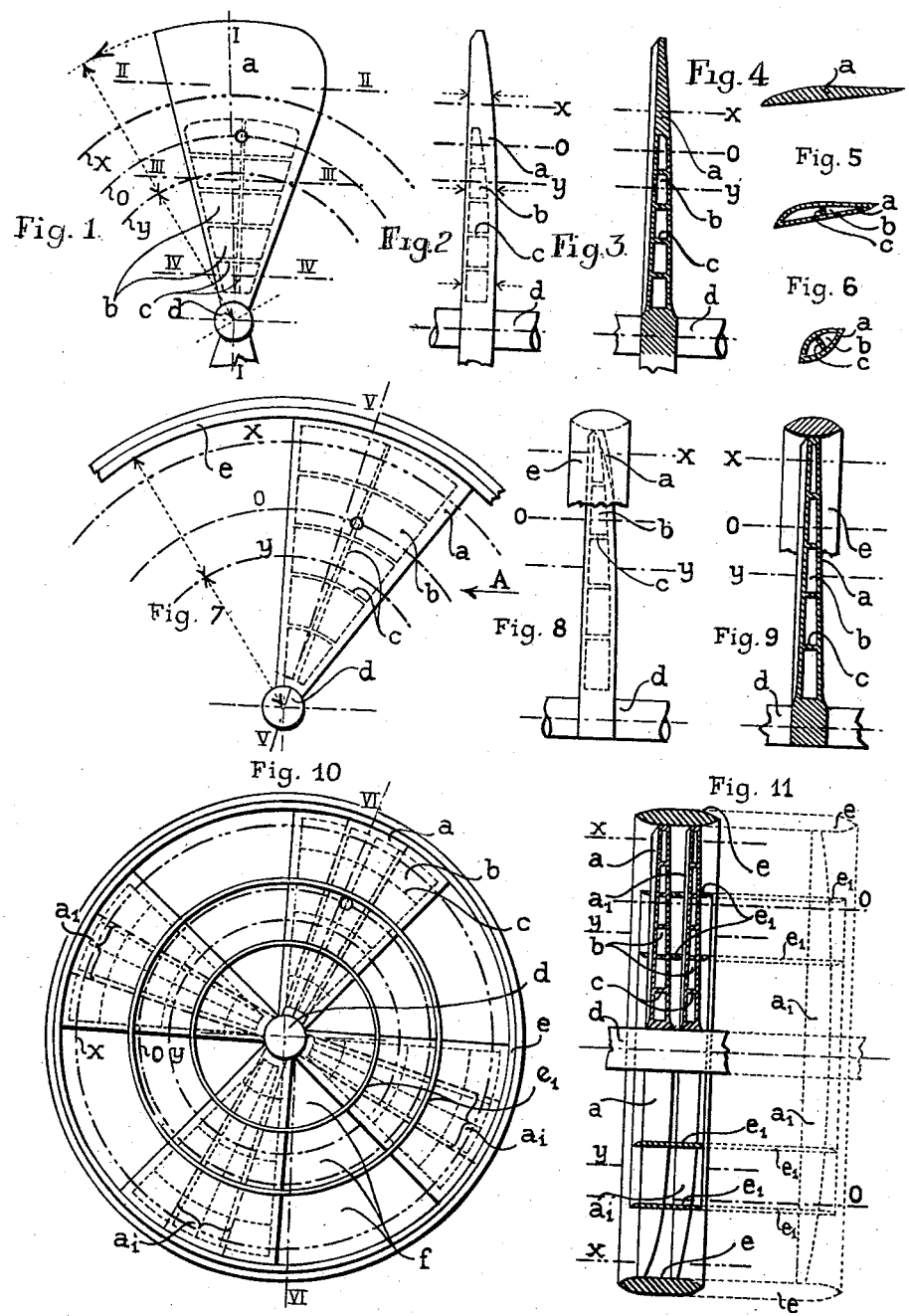

Dec. 17, 1929.  F. SCHUH  1,739,866
WIND AND WATER WHEEL
Filed April 2, 1926   2 Sheets-Sheet 2
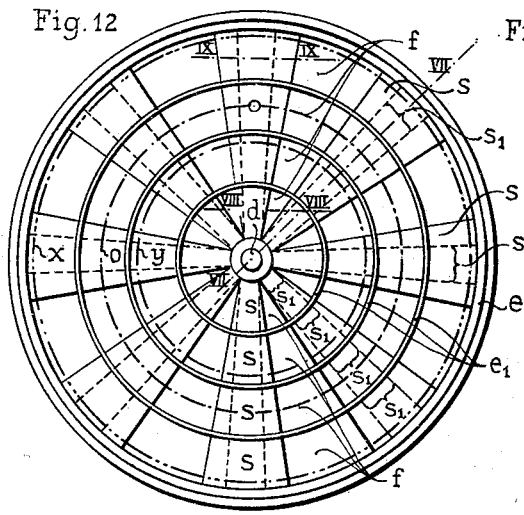
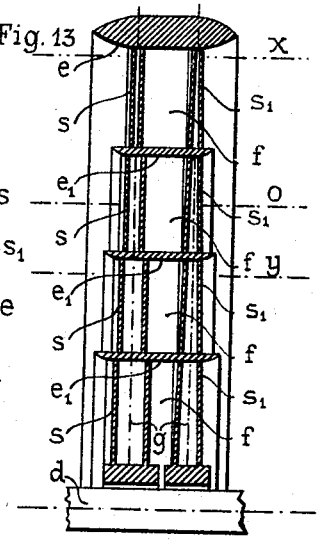
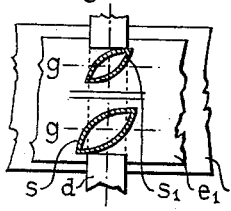
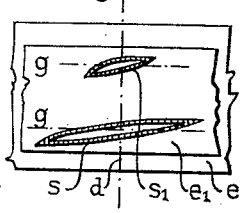
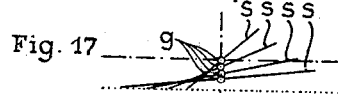
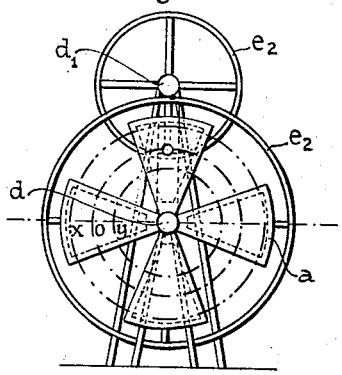
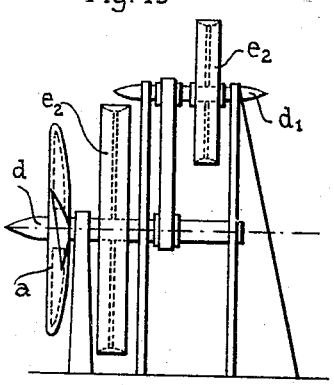
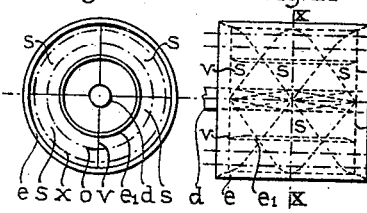
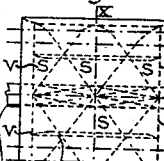
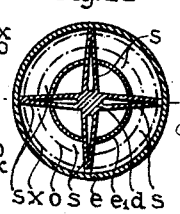

Patented Dec. 17, 1929

1,739,866

UNITED STATES PATENT OFFICE

FRANZ SCHUH, OF VIENNA, AUSTRIA

WIND AND WATER WHEEL

Application filed April 2, 1926, Serial No. 99,398, and in Austria April 25, 1925.

The invention relates to a wind or water wheel, in which the ratio of energy obtained from the shaft is in relation to the centrifugal power of the rotating mass of the wheel.

For this purpose the path of the center of gravity of the wheel blades and associated parts shall be situated as far as possible away from the center of form of the blades towards the outer ends of the latter.

This may be attained by building the wheel in two distinct ways. First, the blades are built hollow or skeleton like beginning from the hub, while the outer end of the blades is plain and massive, so that the line defining the path of the center of gravity shall lie in this massive end; or secondly, the blades are built in their whole length and breadth like a hollow girder construction or skeleton-like in which case special centrifugal masses are arranged on the ends of the so constructed blades.

For a given velocity of the wind there shall correspond a definite weight of the wheel and this weight is heavier the greater the velocity of wind. The maximum weight of the wheel will be smaller, as the line of the path of the centers of gravity of each blade and associated wheel parts advances to the end of the blades. The weight of the fly wheel mass is a multiple of the wheel weight without the ring and according to the power of the wind, for example, two to fifteen times. It results therefrom that the path of the centers of gravity advances farther toward the blade tip when the difference between the weight of the wheel and the ring is greater. Consequently, the absolute weight of the wheel and the ring will be smaller and the effect of the wheel will be greater.

The wind is the means for moving the mass by means of blades. The power derived from the shaft corresponds to the peripherical velocity of the rotating mass.

In the drawings, Figs. 1 to 9 show the essential features of the invention.

Fig. 1 shows in front view, a blade according to this invention;

Fig. 2 is a side elevation of the same;

Fig. 3 is a section thereof on the line I—I in Fig. 1;

Figs. 4, 5 and 6 are sections of a blade on lines II—II, III—III, and IV—IV of Fig. 1;

Fig. 7 shows a modified blade in front elevation, Fig. 8 a side elevation thereof, seen in the direction of the arrow 2, and Fig. 9 is a section on line V—V of Fig. 7;

Figs. 10 to 22 represent several forms of wheels with blades according to the invention.

Fig. 10 is an elevation and Fig. 11 a section on line VI—VI of Fig. 10 of one of these forms.

Fig. 12 is an elevation and Fig. 13 a section on an enlarged scale on line VII—VII in Fig. 12 and these figures show another form of wheel with helical blades. Figs. 14 and 15 are sections also in an enlarged scale on the lines VIII—VIII and IX—IX in Fig. 12.

Figs. 16 and 17 are diagrams relating to the positions of the helical planes of the wheel.

Figs. 18 and 19 show the combination of a fly wheel with a blade wheel in front and side elevation.

Figs. 20, 21 and 22 represent another modification of a wind or water wheel in front and side elevation and in section on line X—X of Fig. 21.

As seen the blade $a$ (Figs. 1–6) is provided towards the axis $d$ with hollows $b$ and ribs $c$ therein, to form a skeleton interior, while the outer end of the blade is massive. Thereby the circular path, line $x$, of the centers of gravity of the rotating blades is shifted far outward beyond the path of the line of the projected centers of form $o$ of the blade, which latter line lies beyond the middle of the length $y$ of the blade towards the outer end. The path of the centers of gravity of the blades takes into consideration all the associated blade parts of the whole mass, i. e. of the shaft, the hub and blades.

According to Figs. 7–9, the blade $a$, which is hollow throughout and as light as possible, supports on its outer circular end a cylindrical mass $e$ which is provided with sharpened edges projecting axially beyond both sides of the blades and thereby gives the smallest resistance to the power fluid. The weight of the ring must be chosen in accordance with the speed of the wind and with the diameter of the wheel. In this manner the path $x$ of the centers of gravity is shifted as far as possible to the end of the blade. The sharpened edges of the smooth and unperforated ring project in an axial direction beyond the front and rear edges of the blade.

In the above with respect to Figs. 1 to 9, is characterized the principle of the invention and the employment of these blades for low wind velocities up to 10 m.

Referring to Figs. 10-22, these figures show the practical use of the principle for large and maximum wind velocities, (about 10-40 m.).

For using large wind velocities a single wheel (Figs. 7-9) is not sufficient as regards strength and in this case two or more of such wheels similar in all respects must be placed one behind the other for the purpose of utilizing a suitable construction of a heavy fly wheel cylinder (Figs. 10 and 11) common to all the wheels.

Behind the main wheel $a$, is situated an auxiliary wheel $a^1$, this auxiliary wheel may be arranged immediately behind the main wheel or, as indicated in dotted lines, at some distance from the same. Both wheels carry a single fly wheel cylinder $e$ on their outer periphery. Moreover these wheels are connected rigidly by intermediate rings $e^1$ which are arranged between the shaft and the main ring $e$ at suitable distances from one another. By means of the intermediate rings and of the blades, cells $f$ are formed. The axes of the blades are arranged perpendicular to the axis $d$ of the wheel, in which case the planes of the blades of both wheels are parallel to each other; or the axes of the blades may be inclined in a direction outward from each other.

The blades of the auxiliary wheel may have the same dimensions as those of the main wheel. The main ring $e$ and the intermediate rings $e^1$ are unperforated in their surface and quite smooth; the section of these rings is solid or girder like and the sharpened edges project over the edges of the blades before and behind the plane of the same. The path $x$ of the centers of gravity of the wheel is situated outward beyond the projected middle point $o$ of the center of form of the blade and this point $o$ itself lies outward of the middle $y$ of the radius of the wheel.

In the Figs. 12-17 another modification is represented, showing a large screw wheel also for large wind velocities.

This construction consists of a main wheel S and an auxiliary wheel $s^1$. The screw planes situated between the axis of the wheel and the intermediate rings $e^1$ and the main ring $e$ lie either in alinement radially, in which case the common axis $g$ is perpendicular to the axis $d$, Fig. 16; or the axis $g$ of the several planes $s$ and $s^1$ are shifted along the axis $d$ of the wheel towards one side for the successive blades, as shown in Fig. 17, so that the distance between the main and auxiliary wheels will be shorter from cell to cell in an outward direction and the blades of both wheels will be parallel to each other. In one and the same cell $f$ the acute angle formed by the axis $d$ of the wheel and the plane of the screw of the main and auxiliary wheel is the same; this angle is smallest in the cell nearest to the axis of the wheel and will be greater and greater in the successive cells in outward direction. The surfaces of the screw blades $s$ and $s^1$ are either parallel or inclined to each other towards the outer periphery. The main and intermediate rings sharpened at each end, have a smooth, unperforated surface and project beyond the front and rear edges of the blades. The line of gravity $x$ is situated at the end of the blade and lies far outward the middle point $o$ of the blade.

In the modification shown in Figs. 18 and 19 in lieu of the ring $e$ a fly wheel $e^2$ is fixed on the shaft $d$; this wheel $e^2$ may also be mounted on an axis $d^2$ situated out of the line of the shaft $d$.

According to the modification shown in Figs. 20-22, the four screw blades $s$, formed hollow throughout their length have edges $v$ perpendicular to the shaft $d$ and are arranged in relation to this shaft at a smaller angle, so that a screw wheel including a long cylinder $e$ is formed without an auxiliary wheel.

Intermediate rings $e^1$ serve to stiffen the screw blades one to the other. The edges of the rings $e$ and $e^1$ projecting beyond the edges of the screw blades are sharpened. The lines of section of the screws $s$ and of the shaft $d$ and the cylinder mantle $e$ are shown in Fig. 21 in dotted lines, diagonally indicated.

I claim—

1. A fluid operated power wheel, comprising a shaft, a hub secured thereto, hollow stationary, rigid skeleton blades secured to the hub and having a solid mass at their outer ends, the path of the centers of gravity of the above mentioned parts lying beyond the path of the center of form of the blades in said solid mass, and the weight of the whole rotating mass of the wheel, i. e. the shaft, hub and blades, being chosen for a definite fluid pressure.

2. A fluid operated power wheel, comprising a shaft, a hub secured thereto, hollow, stationary, rigid skeleton blades secured to the hub and an unperforated ring mass secured to the outer ends of the blades, said ring having sharpened edges projecting to the front and rear of the blades and of sufficient weight to shift the path of the center of gravity of the above mentioned combined parts near the outer ends of the blades beyond the path of the center of form of the blades and the weight of the whole rotating mass of the wheel, i. e. the shaft, hub, blades and ring, being proportioned to the speed of the fluid operating on said wheel.

3. A fluid operated power wheel, comprising a shaft, a plurality of sets of axially displaced hollow, stationary, rigid skeleton blades mounted on said shaft, a hub for each set of blades mounted on the shaft, a continuous unperforated ring connecting the outer ends of the blades and having sharpened ends projecting axially beyond the sets of blades, the line containing the centers of gravity of the assembled parts lying near the periphery of the wheel far away from the center of form of the blades and the weight of the whole rotating mass of the wheel being proportioned to the speed of the operating fluid.

4. A fluid operated power wheel, comprising a plurality of sets of hollow, stationary, rigid skeleton blades, a hub therefor, a shaft on which the hub is mounted, an unperforated main ring common to both sets of blades and secured to their outer ends and having sharpened edges projecting axially beyond both sides of the blade sets and similar rings secured between the hub and the aforementioned ring forming a rigid structure with the blades, said similar rings also having sharpened edges projecting axially beyond both sides of the blade sets, the line of the center of gravity of the combined structure being shifted by the weight of the main ring near the end of the blades beyond the center of form of the blades and the weight of the whole rotating mass of the wheel proportioned to the speed of the fluid driving the wheel.

5. A fluid operated power wheel, comprising a shaft, a hub thereon, a plurality of sets of hollow, stationary, rigid skeleton blades, the blades of one set being parallel to the blades of another set, an unperforated main ring connecting the outer ends of the blades of both sets and having sharpened edges projecting axially beyond the sets of blades, a plurality of similar additional rings arranged between the hub and the aforesaid ring having sharpened edges projecting axially beyond the sets of blades and forming cells between the blades, all of said rings and blades forming a rigid structure, the line of the center of gravity of the combined structure being shifted by the weight of the main ring towards the periphery of the wheel beyond the center of form of the blades and the weight of the complete rotating wheel mass proportioned to the speed of the fluid acting on the wheel.

6. A fluid operated power wheel, a shaft, a hub thereon, a plurality of sets of hollow, stationary, rigid skeleton blades secured to said hub and outwardly directed therefrom with the blades of one set inclined to the blades of another set, a closed unperforated main ring connecting the outer ends of the blades, a plurality of unperforated similar rings arranged between the hub and the aforementioned ring forming cells between the blades of the sets and a rigid structure, said main ring and the similar rings having sharpened edges projecting axially beyond the sets of blades, the line of the center of gravity of the wheel shifted by the weight of the main ring towards the periphery of the wheel beyond the center of form of the blades and the weight of the complete rotating wheel mass proportioned to the speed of the fluid acting on the wheel.

7. A fluid operated power wheel, comprising a shaft, a hub thereon, a main ring and intermediate rings, a plurality of sets of hollow, stationary, rigid helical blades arranged between cells formed by the hub, the intermediate rings and the main ring, and making an acute angle with the axis of the wheel, said angle being the same for all the blades of a set, but increasing for the blades from cell to cell in an outward direction, the axis of the blades of the sets being inclined to each other in the outward direction, all the rings having sharpened front and rear edges projecting axially beyond the sets of blades and connected with the blades a form a rigid structure, the line of the center of gravity of the wheel being shifted by the weight of the main ring towards the periphery of the wheel beyond the center of form of the blades and the weight of the complete rotating mass of the wheel proportioned to the speed of the fluid driving the wheel.

8. A fluid operated power wheel, comprising a shaft, a hub thereon, a main ring and similar rings between the hub and main ring, a plurality of sets of hollow, stationary, rigid, helical blades, arranged substantially parallel between the cells formed by the hub, similar rings and the main ring, the radial axis of the helical blades of the sets being displaced with respect to each other, and perpendicular to the axis of the wheel, all the rings having sharpened ends projecting axially beyond the sets of blades and fixed to the blades forming a rigid structure, the line of the centers of gravity of the blades being shifted by the weight of the main ring towards the periphery of the wheel beyond the center of form of the blades and the weight of the complete rotating mass of the wheel proportioned to the speed of the fluid acting on the wheel.

9. A fluid operated power wheel, comprising a shaft, a hub thereon, hollow, stationary, rigid, helical blades secured to the hub, an unperforated main ring mass secured to the outer ends of the blades and similar rings arranged between the hub and the aforesaid ring having sharpened edges projecting axially beyond the ends of the blades, said blades forming with the axis of the wheel an acute angle, the line of the center of gravity of the wheel being shifted by the weight of the main ring towards the periphery of the wheel beyond the center of form of the blades and the weight of the complete rotating mass of the wheel proportioned to the speed of the fluid operating the wheel.

In testimony that I claim the foregoing as my invention, I have signed my name.

FRANZ SCHUH.